United States Patent [19]

Gibbs et al.

[11] 4,363,792
[45] Dec. 14, 1982

[54] DEFLUORINATION OF FUMED SILICA

[75] Inventors: Marylu B. Gibbs, Midland, Mich.; Robert D. Biggs; David W. Alsgaard, both of Baton Rouge, La.

[73] Assignee: The Dow Chemical Company, Midland, Mich.

[21] Appl. No.: 291,220

[22] Filed: Aug. 10, 1981

Related U.S. Application Data

[63] Continuation-in-part of Ser. No. 150,784, May 19, 1980, abandoned.

[51] Int. Cl.³ ............................................. C01B 33/18
[52] U.S. Cl. ................................ 423/335; 106/288 B; 423/336
[58] Field of Search ................... 423/335, 336; 34/22, 34/26; 106/288 B

[56] References Cited

U.S. PATENT DOCUMENTS 3,053,627 9/1962 Flemmert ............................ 423/336

FOREIGN PATENT DOCUMENTS 1003957 9/1965 United Kingdom ................ 423/336

Primary Examiner—Jack Cooper
Attorney, Agent, or Firm—A. J. Young

[57] ABSTRACT

A process for defluorination of a fluoride-containing fumed silica, which comprises entraining the silica in a high velocity stream of steam at an elevated temperature for a few seconds and then separating the defluorinated silica from the steam, thereby obtaining a fumed silica product with a substantially reduced fluoride content.

4 Claims, 1 Drawing Figure

DEFLUORINATION OF FUMED SILICA

CROSS-REFERENCE TO RELATED APPLICATION

This application is a continuation-in-part of application Ser. No. 150,784, filed May 19, 1980, now abandoned.

BACKGROUND OF THE INVENTION

This invention relates to the defluorination of fumed silica. More particularly, this invention relates to a process for the defluorination of fumed silica made in a fluoride process wherein the fumed silica is substantially uniformly entrained in a stream of steam at a temperature above about 1200° F. and, thereafter, is separated from the steam to obtain a fumed silica product with a substantially reduced fluoride content.

Fumed silica, made in a fluoride process by the flame hydrolysis of silicon tetrafluoride, contains between two and four percent fluoride. This fluoride-rich silica has hydrophobic properties and is subject to a substantial loss of surface area under ordinary storage conditions due to a chemical reaction of the fluoride with the silica. When the fluoride content of the silica is reduced to half a percent or less, the silica becomes hydrophilic, and its surface area remains stable under ordinary storage conditions.

It is known that fumed silica may be defluorinated by thermal means alone, but high temperatures and long residence times are necessary to achieve satisfactory results. Lower temperatures and shorter residence times can be achieved by the addition of steam in the process. Lower temperatures are also beneficial in reducing the probability of sintering. The presence of steam ensures that the surface of the silica will include silanol groups, which are thought to be necessary for the hydrophilic, thickening and thixotropic properties of fumed silica. This invention provides a more efficient steam process for the defluorination of fumed silica than exists at the present time.

SUMMARY

In general, this invention provides a process for the defluorination of fumed silica. The process comprises the steps of (a) uniformly entraining the fluoride-containing fumed silica in a high velocity stream of steam at a temperature above about 1200° F.; and (b) thereafter separating the fumed silica from the steam, thereby obtaining a fumed silica product with a substantially reduced fluoride content. The term "entraining" as herein defined means the collecting and transporting of fumed silica in a high velocity stream of steam while maintaining a substantially uniform distribution of the silica in the steam. The silica may be pre-mixed in steam below 1200° F. and the combination then heated to above about 1200° F. or the silica may be entrained directly into steam that has been superheated to temperature above about 1200° F. Also, the high velocity stream of steam as herein defined may include a substantial amount of inert gas such as air for entraining the fumed silica provided the 1200° F. temperature limitation is maintained. In addition, the residence time of the fumed silica in the steam may vary from as little as one second up to several seconds. It is also beneficial to repeat the process step sequence at least one additional time to obtain a final fumed silica product that is further reduced in fluoride content, which repeat sequence can be characteristically compared to a series of liquid-liquid extraction steps.

It is an object of the present invention to provide a process for the more efficient defluorination of fumed silica. It is a further object of the invention to provide a process for defluorinating fumed silica which contains between two and four percent fluoride, thereby obtaining a defluorinated silica containing less than five-tenths percent fluoride on a weight basis. It is a still further object to provide a process for stabilizing the surface area of fumed silica under normal storage conditions. It is a still further object to provide a process for changing the initially hydrophobic surface of fumed silica to a hydrophilic surface. Other objects of the invention will be apparent to those skilled in the art from the more detailed description which follows.

DESCRIPTION OF THE PREFERRED EMBODIMENTS

Figure 1:
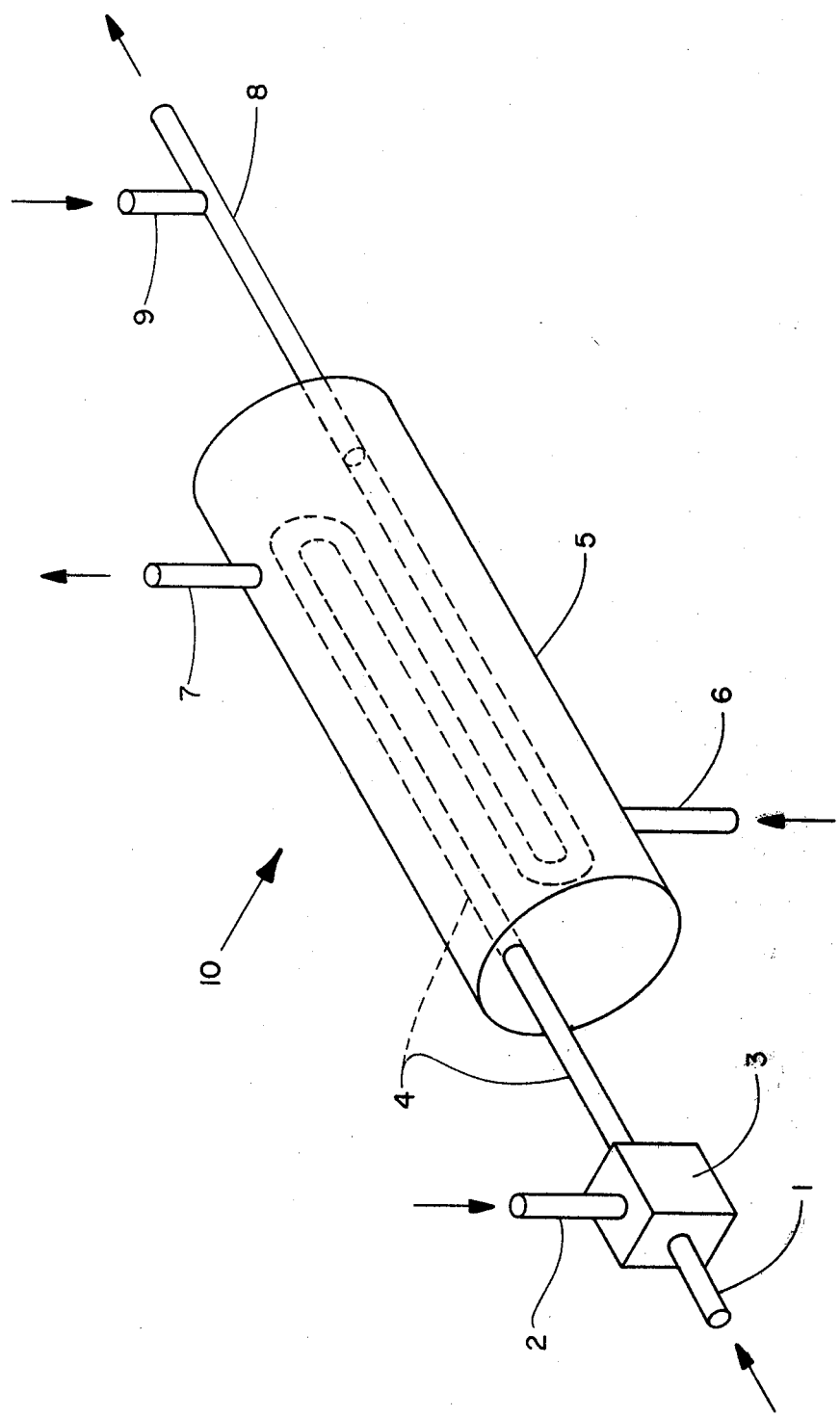
FIG. 1 is an isometric representation of a defluorinator for defluorinating fumed silica constructed according to the principles of the present invention.

More specifically, referring to FIG. 1, a defluorinating unit 10 for defluorinating fumed silica is illustrated. Super-heated steam and fluoride-containing fumed silica are introduced to the unit 10 through pipes 1 and 2, respectively. The fluoride-containing fumed silica is premixed with the super-heated steam in a venturi ejector 3, thereby providing an intimate entrained dispersion of the silica in the steam. The high velocity stream of super-heated steam and entrained silica then traverses an elongated serpentine pipe 4 which pipe 4 is enclosed in a hollow shell 5. A heated fluid is passed through the shell 5 via an entrance pipe 6 and an exit pipe 7 to maintain the high velocity stream in the pipe 4 at the desired temperature. The high velocity stream leaves unit 10 through a pipe 8 which, in turn, transports the stream to a separator means, not shown, such as a cyclone separator, where the defluorinated fumed silica product is separated from the steam. The defluorinated fumed silica product may be further lowered in fluoride content by repeating the above process steps as many times as desired.

Before entering the separator means, the stream of silica and steam may be mixed with a sidestream of inert gas introduced through a pipe 9. Diluting the stream of silica and steam with such a sidestream beneficially minimizes or prevents the re-combination of the silica with the fluoride before separation. The inert gas is preferably air.

The temperature of the steam and entrained fumed silica is beneficially maintained above about 1200° F., since significant defluorination of the silica is difficult to achieve below this temperature. Preferably, the temperature is maintained between about 1300° F. and about 1700° F. The residence time of the stream within the defluorination unit is benficially between about one second and about twelve seconds, and preferably, between about one second and about five seconds. The ratio of steam to silica introduced into the defluorination unit is beneficially between about two to one and about twenty to one by weight, and preferably, between about four to one and about eight to one by weight.

The linear flow velocity of the stream of steam and entrained silica is at least about three-hundred centimeters per second and, more preferably, the linear flow velocity is at least about eight-hundred centimeters per second. The defluorination unit may be fabricated from any material that can withstand the defluorination temperatures. For example, a metal alloy such as Inconel or high temperature stainless steel may be beneficially used.

The present invention is further illustrated by the following examples.

EXAMPLE 1

A defluorination unit similar to that shown in FIG. 1 and a cyclone separator were constructed as a pilot plant for defluorination of fluoride-containing fumed silica. Fumed silica containing about three percent fluoride, 30,000 parts per million, on a weight basis was used as a starting material. The feed rates through the defluorination unit were approximately forty to fifty pounds per hour of superheated steam and four to ten pounds per hour of fumed silica. The defluorination results of several runs through this unit, including the temperature of the steam-silica stream, the residence time of the silica in the steam, the steam/silica weight ratio, and linear velocity of the steam-silica stream are summarized in Table 1 below.

TABLE 1

| Run No. | Temp. (°F.) | Residence Time (Seconds) | Steam/ Silica Wt. Ratio | Lin.Vel. cm/sec. | Fluoride Content (after defluor.) PPM |
|---|---|---|---|---|---|
| 1 | 1267 | 1.3 | 10.8 | 2626 | 3,167 |
| 2 | 1360 | 6.7 | 4.55 | 510 | 4,918 |
| 3 | 1365 | 6.9 | 7.97 | 495 | 2,950 |
| 4 | 1525 | 6.2 | 13.3 | 551 | 2,394 |
| 5 | 1540 | 6.4 | 3.4 | 533 | 9,010 |

The results of Table 1 show that an increase in the steam/silica weight ratio leads to an increase in the defluorination of the silica.

EXAMPLE 2

Using a defluorination unit similar to that in FIG. 1 and Example 1, a second series of fumed silica defluorination runs were made. The fumed silica was passed through the defluorination unit three times for each run. The fluoride content of the starting fumed silica for each run was about three percent, 30,000 parts per million, on a weight basis, and the steam-to-silica weight ratio was maintained constant at about five-to-one for each pass through the unit. The residence time for each pass of Runs 1–3 through the unit was about one and a half seconds, a linear velocity of about 975 cm/sec, except for Run 4 where the residence time per pass was about three seconds, a linear velocity of about 488 cm/sec. The defluorination results of this example are summarized in Table 2 below.

TABLE 2

| Run No. | Temp. (°F.) | Fluoride Content - PPM (after defluorination) | | |
|---|---|---|---|---|
| | | First Pass | Second Pass | Third Pass |
| 1 | 1350 | 9,700 | 3,000 | 1,150 |
| 2 | 1454 | 6,800 | 1,300 | 580 |
| 3 | 1500 | 8,500 | 2,600 | 980 |
| 4 | 1400 | 8,032 | 2,620 | 1,154 |

The data shown in Table 2 clearly demonstrates that defluorination of silica with residence times of a few seconds is possible. In addition, comparing Runs 1–3 with Run 4, the results show that increased defluorination can be obtained by repeated defluorination passes as compared to a single pass for approximately the same total residence times.

EXAMPLE 3

Using a defluorination unit similar to that shown in FIG. 1, a third series of fumed-silica defluorination runs was made. The fumed silica was passed through the defluorination unit with the fluoride content of the starting fumed silica for each run being about three percent, 30,000 parts per million, on a weight basis. Quench air was added to the unit through the pipe 9. The quench air was added at a rate of 169, 63 and 137 pounds per hour for Runs Nos. 1, 2 and 3, respectively. The experimental conditions and results are summarized in Table 3 below.

TABLE 3

| Run No. | Temp. (°F.) | Residence Time (Seconds) | Steam/ Silica Wt. Ratio | Lin.Vel. cm/sec. | Fluoride Content (after defluor.) PPM |
|---|---|---|---|---|---|
| 1 | 1260 | 3.0 | 21.8 | 488 | 2,310 |
| 2 | 1225 | 3.9 | 16.4 | 375 | 3,220 |
| 3 | 1335 | 1.5 | 16.6 | 975 | 3,018 |

While certain representative embodiments and details have been shown for the purpose of illustrating the present invention, it will be apparent to those skilled in the art that various changes and modifications can be made therein without departing from the spirit and scope of the invention. For example, the process is not limited to defluorination, but could be used to dehalogenate silica in general. In utilizing the process for any of the other halogens, e.g. chlorine, bromine, or iodine, lower dehalogenation temperatures are feasible. Such temperatures may be substantially below 1000° F., but normally not below about 212° F. at atmospheric pressure because of the inherent problem of steam condensation. In general, such temperatures would beneficially lie between about 300° F. and about 800° F.

What is claimed is:

1. A process for defluorinating fluoride-containing fumed silica, which comprises the steps of:
    a. premixing the silica and super-heated steam in a venturi ejector thereby forming a high-velocity stream of entrained silica and super-heated steam having a linear flow velocity of at least about three hundred centimeters per second and a temperature above about 1200° F.;
    b. passing the stream of entrained silica and steam through an elongated passageway while maintaining the stream at a linear velocity of at least about three hundred centimeters per second and at a temperature above about 1200° F.; the residence time of the stream in the venturi ejector and elongated passageway being betwee about one second and about twelve seconds and the ratio of steam to silica being between about two to one and about twenty to one on a weight basis and
    c. separating the silica from the steam, said silica containing less than about 0.5 weight % fluoride.

2. The process of claim 1 wherein the ratio of steam to silica is between about four to one and about eight to one on a weight basis.

3. The process of claim 1 wherein the stream of entrained silica and steam is mixed with a sidestream of inert gas after step b whereby the stream of entrained silica and steam is diluted thereby minimizing recombination of the silica with the fluoride before the silica is separated in step c.

4. The process of claim 3 wherein the ratio of steam to silica is between about four to one and about eight to one on a weight basis.

* * * * *